US007685386B2

(12) United States Patent
Bitar

(10) Patent No.: US 7,685,386 B2
(45) Date of Patent: Mar. 23, 2010

(54) DATA STORAGE RESYNCHRONIZATION USING APPLICATION FEATURES

(75) Inventor: Akram Bitar, Kfar Peqiin (IL)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 11/626,717

(22) Filed: Jan. 24, 2007

(65) Prior Publication Data

US 2008/0177962 A1 Jul. 24, 2008

(51) Int. Cl.
*G06F 12/00* (2006.01)

(52) U.S. Cl. ...................................... 711/162; 707/204

(58) Field of Classification Search ................ 711/162; 707/204

See application file for complete search history.

(56) References Cited

U.S. PATENT DOCUMENTS 6,185,699 B1 * 2/2001 Haderle et al. ................ 714/19
6,463,573 B1 10/2002 Maddalozzo, Jr. et al.
7,032,089 B1 * 4/2006 Ranade et al. .............. 711/161
7,266,718 B2 * 9/2007 Idei et al. ....................... 714/6
7,318,133 B2 * 1/2008 Yagawa et al. .............. 711/162
7,366,859 B2 * 4/2008 Per et al. .................... 711/162
2003/0195903 A1 * 10/2003 Manley et al. .............. 707/201
2005/0027955 A1 * 2/2005 Lam et al. ................... 711/162
2005/0283504 A1 * 12/2005 Suzuki et al. ............... 707/202

FOREIGN PATENT DOCUMENTS

WO WO03094056 A3 11/2003

OTHER PUBLICATIONS

B. Del-Fabbro et al., "Data management in grid applications providers", *Proceedings. DFMA 05 First International Conference on Distributed Frameworks for Multimedia Applications*, 2005, p. 315-22.

Cho et al., "Effective change detection using sampling", *Proceedings of the Twenty-eighth International Conference on Very Large Data Bases*, 2002, p. 514-25.

* cited by examiner

*Primary Examiner*—Christian P Chace
*Assistant Examiner*—Hashem Farrokh
(74) *Attorney, Agent, or Firm*—Jeffrey P. Aiello

(57) ABSTRACT

A data storage resynchronization system is provided. The system includes a primary site having a primary server, primary storage unit, primary replication agent, and a primary storage controller. Data is written to primary pages on the primary storage unit upon receiving a command to do so from the primary server. A secondary site has a secondary server, secondary storage unit, secondary replication agent for receiving a command from the primary replication agent to write the data at the secondary site and secondary storage controller. Data is written to secondary pages on the secondary storage unit upon receiving a command to do so from the secondary replication agent when the secondary and primary pages correspond, and means for comparing corresponding pages and sending primary pages to the secondary replication agent for replacement of corresponding secondary pages at the secondary site where page-change indicators of the corresponding pages do not match.

16 Claims, 4 Drawing Sheets

DATA STORAGE RESYNCHRONIZATION USING APPLICATION FEATURES

FIELD OF THE INVENTION

The present invention relates to mirrored data storage management in general, and more particularly to resynchronization of mirrored storage.

BACKGROUND OF THE INVENTION

Data storage systems are often configured to maintain a copy or "mirror" of a primary data storage device (hereinafter the "primary"), where data written to the primary are written to a secondary data storage device (hereinafter the "secondary") during a synchronization process. When there is a break in the synchronization process, such as where there is a loss of communications with the secondary, data often continue to be written to the primary, thereby resulting in a loss of synchronization between the primary and the secondary. Once communication with the secondary is reestablished, a resynchronization process is typically initiated to bring the secondary up-to-date. Resynchronization may be performed where the primary storage controller keeps track of which data on the primary have changed, requiring only the changed data to be written to the secondary. This may be done by maintaining a bitmap representing the locations of changed data on the primary that were written to since communication with the secondary was lost, or by calculating and comparing signatures for copies of data on both the primary and the secondary. However, during some primary failures such bitmaps might become lost or corrupted (in some storage platforms the bitmaps can not be maintained), while signature calculation and comparison is processing-intensive and time-consuming, and is also probabilistic, which may lead to data loss. Alternatively, full resynchronization may be performed, where all data on the primary are copied to the secondary. Unfortunately, this solution is even more time-consuming, and typically results in unnecessary copying of identical data.

A storage resynchronization mechanism that allows for fast resynchronization with no data loss would therefore be advantageous.

SUMMARY OF THE INVENTION

The invention in embodiments thereof is a system and method for resynchronization of mirrored storage.

In one aspect of the invention a system is provided for data storage resynchronization including a primary site having a primary server, a primary storage unit, a primary replication agent, and a primary storage controller operative to write data to one or more primary pages on the primary storage unit upon receiving a command to do so from the primary server, a secondary site having a secondary server, a secondary storage unit, a secondary replication agent operative to receive a command from the primary replication agent to write the data at the secondary site, and a secondary storage controller operative to write the data to one or more secondary pages on the secondary storage unit upon receiving a command to do so from the secondary replication agent, where the secondary pages correspond to the primary pages, and means for comparing corresponding ones of the primary and secondary pages, where the means is operative to send the primary page to the secondary replication agent for replacement of the corresponding secondary page at the secondary site where page-change indicators of the corresponding pages do not match.

In another aspect of the invention, a method is provided for data storage resynchronization. The method including writing data to a primary page on a primary storage unit, writing the data to a secondary page on a secondary storage unit, where the secondary page corresponds to the primary page, comparing the corresponding primary and secondary pages, and copying the primary page to the secondary storage unit where page-change indicators of the corresponding pages do not match.

In another aspect of the invention, a method is provided for mirrored storage analysis. The method including creating two storage images of a data storage volume, comparing page-change indicators on corresponding pages on both of the images, and providing an indicator indicating where the page-change indicators of the corresponding pages do not match.

In another aspect of the present invention a method is provided for incremental storage backup, the method including creating a storage image of a data storage volume, comparing a page-change indicator on a page of the data storage volume with a page-change indicator of a corresponding page in the image, and storing the page of the data storage volume in a different backup or image where the page-change indicators do not match.

It is appreciated throughout the specification and claims that the term "page" may also be used to refer to a grouping of one or more "data blocks," such as is used in the DB2™ database systems, or any unit of data that is swapped from main memory to a mass storage device in a manner that is meant to minimize the number of writes to mass storage.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1:
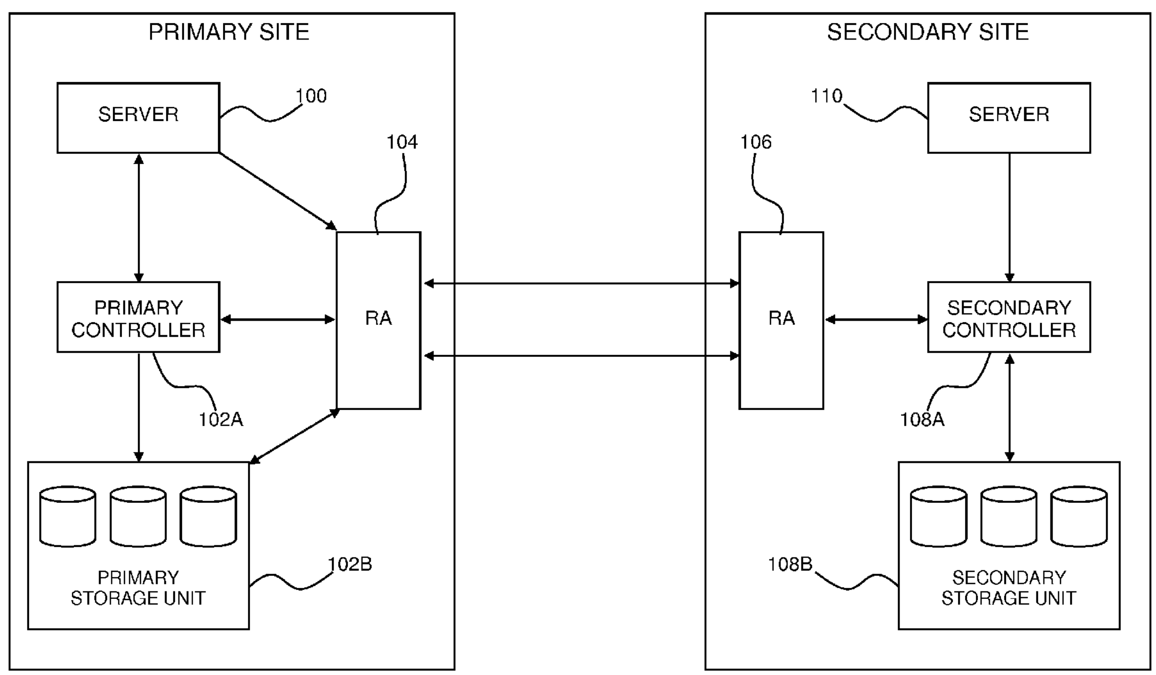
FIG. 1 is a simplified conceptual illustration of a system for data storage resynchronization, constructed and operative in accordance with an embodiment of the present invention.

Reference is now made to FIG. 1, which is a simplified conceptual illustration of a system for data storage resynchronization, constructed and operative in accordance with an embodiment of the present invention. During normal operation of the system of FIG. 1, a server 100, such as a DB2™ host operating at a primary site, instructs a primary storage controller 102A to write data to one or more pages on a primary storage unit 102B, which may include one or more physical data disks or other storage devices. Server 100 or primary storage controller 102A then, either synchronously or asynchronously with the write to primary storage unit 102B, instructs a replication agent (RA) 104, which may reside within primary storage controller 102A or be separate from it, to send the same page writes to an RA 106, such as may be located at a secondary site. RA 106 then instructs a secondary storage controller 108A to write the data to corresponding pages on a secondary storage unit 108B.

Figure 2:
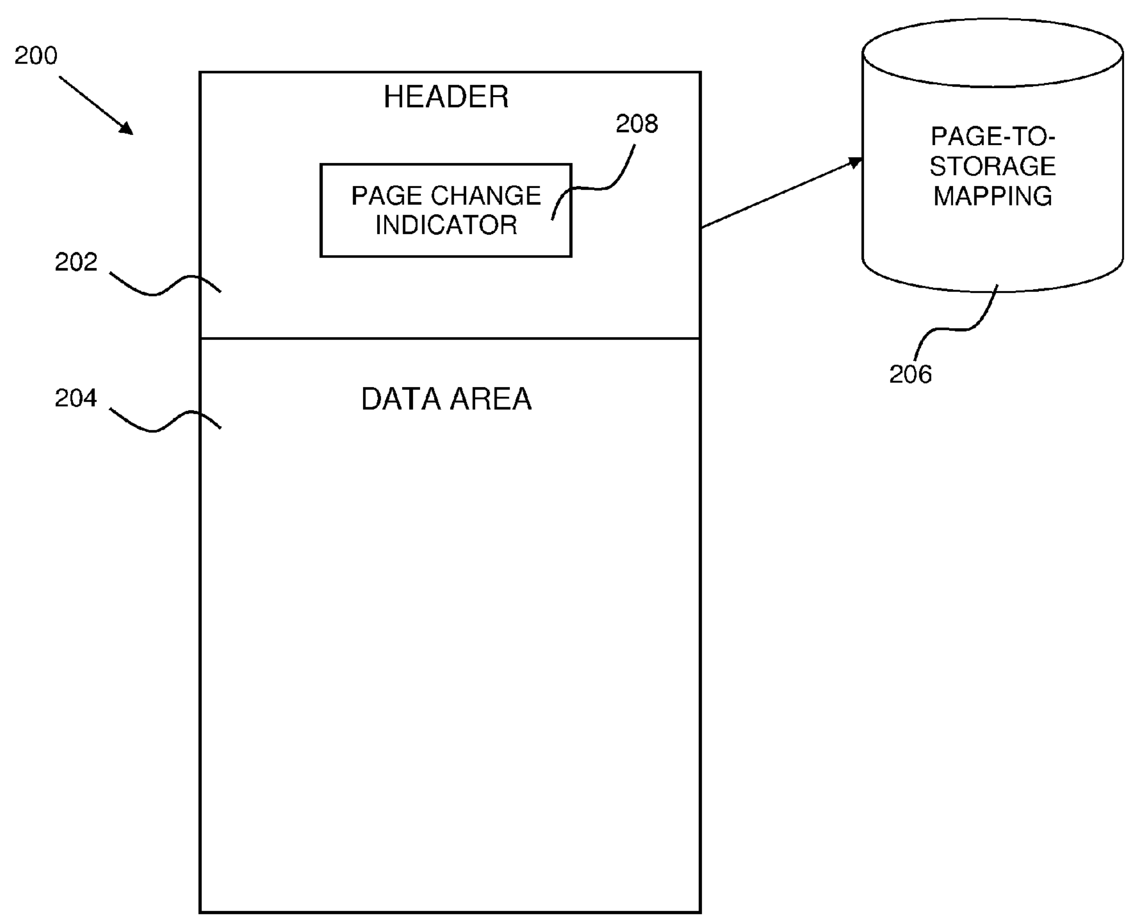
FIG. 2 is a simplified conceptual illustration of a data page, constructed and operative in accordance with an embodiment of the present invention.

Referring additionally to FIG. 2, which is a simplified conceptual illustration of a data page, constructed and operative in accordance with an embodiment of the present invention, a data page 200 typically includes a header 202 and a data area 204. Header 202 typically includes a page-change indicator 208 whose value is changed each time that data is written to page 200, preferably such that the same page never reuses the same page-change indicator value. Thus, for example, in DB2™, when data relating to a transaction are written to one or more pages, the transaction's log sequence number (LSN) may be used for page-change indicator 208. It is appreciated that other applications may use other identifiers, or a set of identifiers, for page-change indicator 208 to indicate that data has been written to a page.

Corresponding data management applications on servers 100 and 102, such as DB2™ or Oracle™, each typically maintain a mapping 206 indicating the storage locations of their data pages. Each page is uniquely identified within each mapping 206, where the same mapped page on servers 100 and 102 share the same unique identifier (e.g., in DB2™ each page has a serial number), although the corresponding primary and secondary pages may be mapped to different relative storage locations at the primary and secondary sites.

Figure 3:
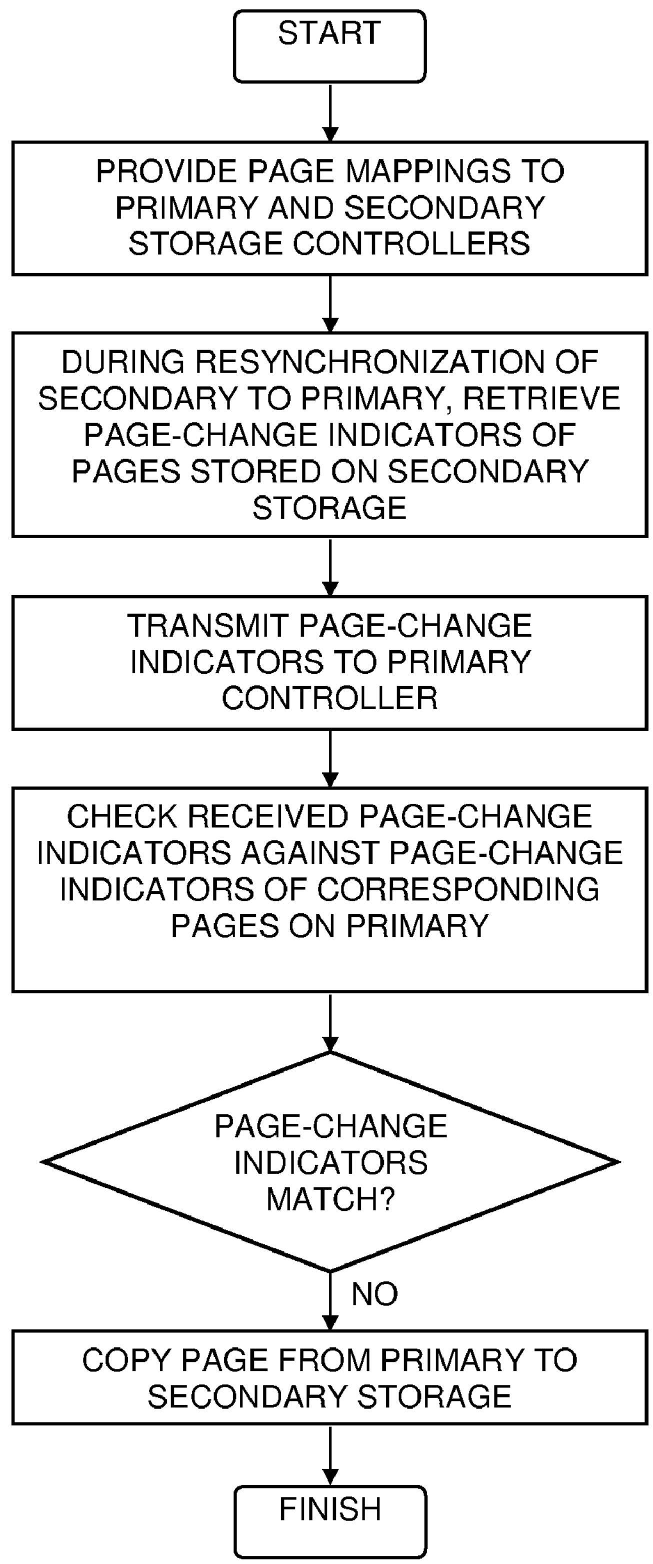
FIG. 3 is a simplified flowchart illustration of an exemplary method of operation of the system of FIG. 1, operative in accordance with an embodiment of the present invention.

Referring again to FIG. 1, and additionally to FIG. 3, which is a simplified flowchart illustration of an exemplary method of operation of the system of FIG. 1, operative in accordance with an embodiment of the present invention, server 100, and its corresponding secondary server 110, provide primary controller 102A and secondary controller 108A respectively with a page mapping indicating where each page is located its respective storage unit, as well as the offset or other location indicator of page-change indicator 208 within each page. This may be performed during configuration of servers 100 and 110 and/or during resynchronization. Should resynchronization of primary 102B to secondary 108B be required, such as after a failure and recovery of RA 104 or its communications channel to RA 106, a resynchronization process may be initiated, such as by primary 102B or by any known storage management application, whereupon secondary controller 108A retrieves the page-change indicators from the pages stored on secondary 108B and transmits each page's unique identifier and its page-change indicator to primary controller 102A, which checks the received page-change indicators against the page-change indicators of the corresponding pages stored on primary 102B. Where the page-change indicators for corresponding pages do not match, primary controller 102A instructs RA 104 to send the corresponding primary page to RA 106, which instructs secondary controller 108A to replace the corresponding secondary page on secondary 108B with the page received from RA 104.

Where server 100 generates sequential page-change indicators for sequential transactions, secondary controller 108A need not send to primary controller 102A all of the page-change indicators from the pages stored on secondary 108B. Secondary controller 108A can instead send a list of the page-change indicators associated with the pages stored on secondary 108B, including the unique identifier of each page that is associated with a given page-change indicator. Primary controller 102A then need only copy those pages having later sequence numbers or that were not received by secondary controller 108A as part of already-received page-change indicators. Where server 100, primary controller 102A, and/or RA 104 is configured such that no page modified as part of a transaction is sent from the primary to the secondary unless all the pages modified as part of the preceding transaction have been sent to the secondary, secondary controller 108A need only send the last sequential page-change indicator that it received. Primary controller 102A then need only copy those pages having later sequence numbers.

It is appreciated that the comparison of page-change indicators for corresponding pages on primary 102B and secondary 108B may be performed by RA 104 instead of primary controller 102A as follows. Primary RA 104 and secondary RA 106 receive page mappings from servers 100 and 110 respectively. Secondary RA 106 then retrieves the page-change indicators from the pages stored on secondary 108B and sends them to primary RA 104, which compares them to the page-change indicators of the corresponding pages stored on primary 102B, and sends to secondary RA 106 any primary pages stored on primary 102B whose page-change indicator doesn't match that of its corresponding secondary page. Secondary RA 106 then instructs secondary controller 108A to replace the corresponding pages on secondary 108B with the pages received from RA 104.

Figure 4:
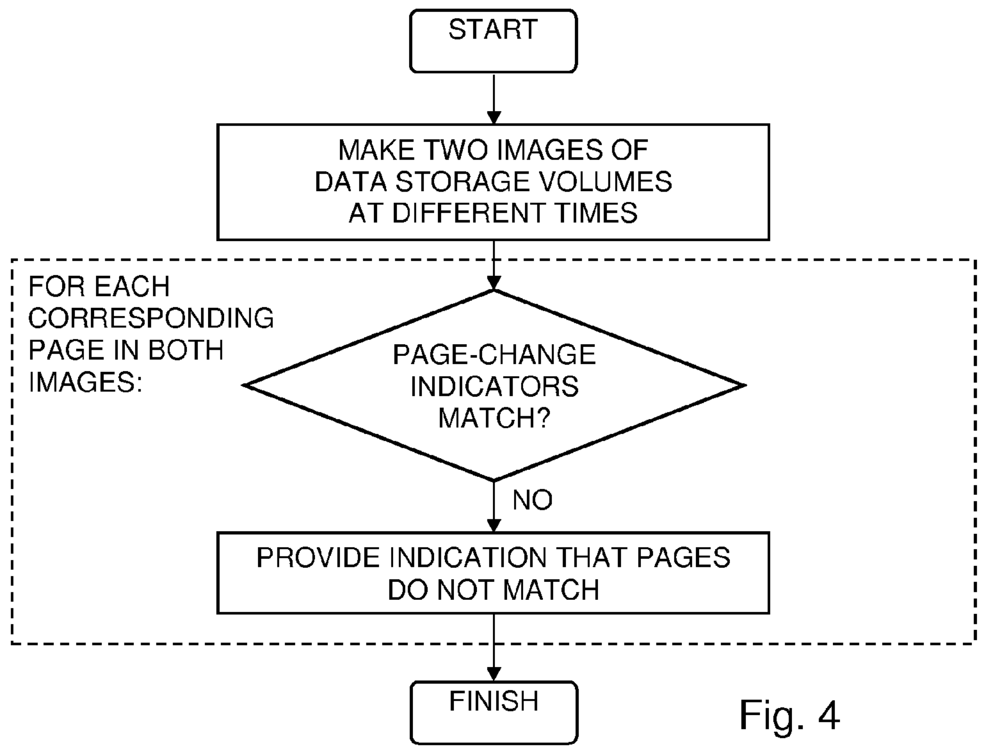
FIG. 4 is a simplified flowchart illustration of a method of mirrored storage analysis, operative in accordance with an embodiment of the present invention.

Reference is now made to FIG. 4, which is a simplified flowchart illustration of a method of mirrored storage analysis, operative in accordance with an embodiment of the invention. In the method of FIG. 4, two storage images, such as point-in-time copies serving as data backups, are made of one or more data storage volumes. A mapping of the data pages in each of the images is then used to compare both images by checking whether the page-change indicators match on corresponding pages on both images. An indicator may then be provided indicating where the page-change indicators do and/or do not match, such as by setting a bit in a bitmap which represents the pages in both images, where, for example, a set bit indicates that a page differs between the two images. The bitmap may be displayed to a user upon request, such as may be used to indicate when sufficient changes have occurred, thus requiring resynchronization.

Figure 5:
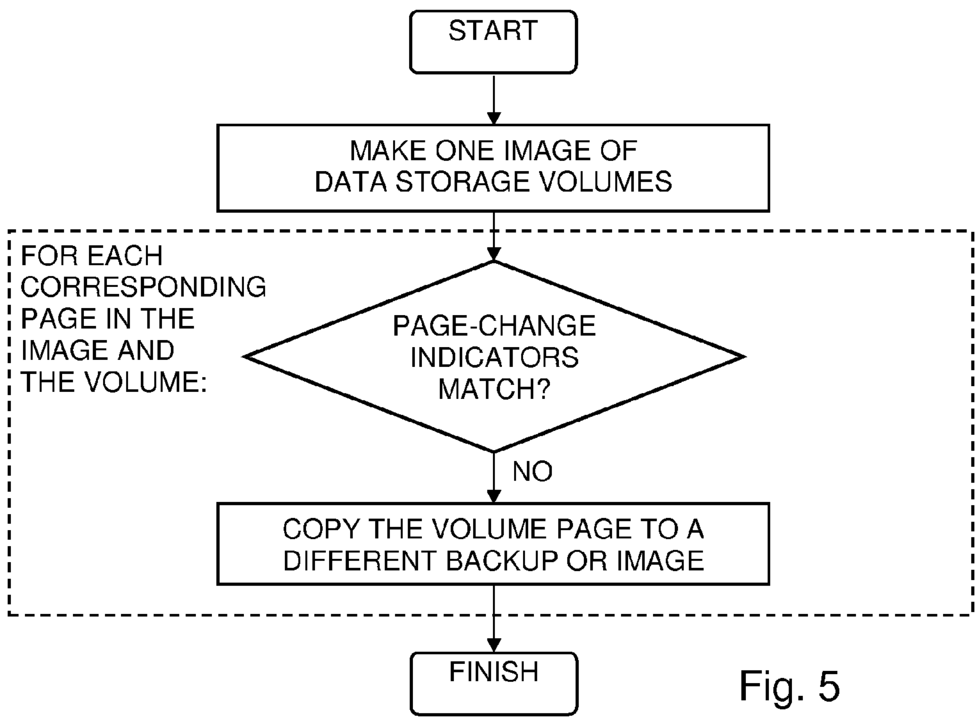
FIG. 5 is a simplified flowchart illustration of a method of incremental storage backup, operative in accordance with an embodiment of the present invention.

Reference is now made to FIG. 5, which is a simplified flowchart illustration of a method of incremental storage backup, operative in accordance with an embodiment of the invention. In the method of FIG. 5, one storage image, such as a point-in-time copy serving as a data backup, is made of one or more data storage volumes. At a predefined later time, a mapping of the data pages on the data storage volumes and in the image is used to compare the page-change indicator of each page on a data storage volume with the page-change indicator of its corresponding page in the image. Where the page-change indicators do not match, the volume page may be stored in a different backup or image.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for data storage resynchronization comprising:

a primary site comprising;
- a primary server;
- a primary storage unit;
- a primary replication agent; and
- a primary storage controller writing data to one or more primary pages on said primary storage unit upon receiving a command to do so from said primary server;

a secondary site comprising;
- a secondary server;
- a secondary storage unit;
- a secondary replication agent receiving a command from said primary replication agent to write said data at said secondary site ; and
- a secondary storage controller writing said data to one or more secondary pages on said secondary storage unit upon receiving a command to do so from said secondary replication agent, said secondary storage controller retrieving page-change indicators from said secondary pages and transmitting said page-change indicators to said primary controller, wherein said secondary pages correspond to said primary pages; and means for comparing said retrieved page-change indicators of said secondary pages against page-change indicators of said corresponding primary pages, said comparing means sending said primary page to said secondary replication agent for replacement of said corresponding secondary page at said secondary site where page-change indicators of said corresponding pages do not match.

2. The system according to claim 1 wherein when data are written to any of said pages, said page-change indicator of said page has a different value.

3. The system according to claim 1 wherein when data are written to any of said pages, said page-change indicator of said page has a value that was not previously used for said page.

4. The system according to claim 1 wherein a DB2™ transaction's log sequence number (LSN) is used for said page-change indicator.

5. The system according to claim 1 wherein said page-change indicators are sequential, wherein said secondary controller sending the sequentially last page-change indicator found on said secondary pages, and said comparing means sending said primary page to said secondary replication agent for replacement of said corresponding secondary page at said secondary site where primary page-change indicators are sequentially later than said last page-change indicator.

6. The system according to claim 1 wherein said secondary controller sending a list of said page-change indicators associated with said secondary pages stored on said secondary storage unit, including a unique identifier of each of said secondary pages that is associated with a given one of said page-change indicators, and wherein said primary replication agent embodies said comparing means and is operative to check said received page-change indicators and unique identifiers against said page-change indicators and unique identifiers of said corresponding primary pages and to send only those of said primary pages to said secondary replication agent that were not previously received by said secondary controller.

7. The system according to claim 1 wherein said secondary replication agent retrieving said page-change indicators from said secondary pages and transmitting said page-change indicators to said primary replication agent, wherein said primary replication agent embodies said comparing means and is operative to check said received page-change indicators against said page-change indicators of said corresponding primary pages.

8. The system according to claim 1 wherein said page-change indicator is formed from a set of two or more identifiers.

9. A method for data storage resynchronization, the method comprising:
- writing data to a primary page on a primary storage unit;
- writing said data to a secondary page on a secondary storage unit, wherein said secondary page corresponds to said primary page;
- comparing page-change indicators of said corresponding primary and secondary pages;
- copying said primary page to said secondary storage unit where page-change indicators of said corresponding pages do not match; and
- writing a different page-change indicator value to any of a plurality of primary pages when data are written to any of said plurality of primary pages.

10. The method according to claim 9 further comprising writing a different page-change indicator value to any of a plurality of primary pages when data are written to any of said plurality of primary pages, where said page-change indicator written to any of said plurality of primary pages has a value that was not previously used for said page.

11. The method according to claim 9 and further comprising using a DB2™ transaction log sequence number (LSN) for said page-change indicator.

12. The method according to claim 9 and further comprising retrieving a page-change indicator from said secondary page, and comparing said retrieved page-change indicator against a page-change indicator of said corresponding primary page.

13. The method according to claim 9 and further comprising sequencing page-change indicators, determining the sequentially last page-change indicator found on a plurality of secondary pages, and copying any of a plurality of primary pages from said primary storage unit to said secondary storage unit whose page-change indicator is sequentially later than said last page-change indicator.

14. The method according to claim 9 and further comprising sequencing page-change indicators, compiling a list of said page-change indicators associated with a plurality of secondary pages stored on said secondary storage unit, including a unique identifier of each of said secondary pages that is associated with a given one of said page-change indicators, checking said page-change indicators and unique identifiers against page-change indicators and unique identifiers of any of a plurality of corresponding primary pages, and copying any of said primary pages to said secondary storage unit that were not previously received by said secondary storage unit.

15. The method according to claim 9 and further comprising retrieving a plurality of page-change indicators from a plurality of secondary pages and checking said page-change indicators against page-change indicators of a plurality of corresponding primary pages.

16. The method according to claim 9 and further comprising forming said page-change indicator from a set of two or more identifiers.

* * * * *